US009766996B1

United States Patent
Cao et al.

(10) Patent No.: US 9,766,996 B1
(45) Date of Patent: Sep. 19, 2017

(54) LEARNING-BASED DATA PROCESSING JOB PERFORMANCE MODELING AND PREDICTION

(71) Applicant: EMC Corporation, Hopkinton, MA (US)

(72) Inventors: Yu Cao, Beijing (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 754 days.

(21) Appl. No.: 14/090,146

(22) Filed: Nov. 26, 2013

(51) Int. Cl.
 *G06F 11/34* (2006.01)
(52) U.S. Cl.
 CPC ................................ *G06F 11/3447* (2013.01)
(58) Field of Classification Search
 None
 See application file for complete search history.

(56) References Cited

U.S. PATENT DOCUMENTS

| 2013/0254196 | A1* | 9/2013 | Babu | G06F 17/30595 707/736 |
| 2014/0026147 | A1* | 1/2014 | Cherkasova | G06F 9/505 718/105 |
| 2014/0215471 | A1* | 7/2014 | Cherkasova | G06F 11/3428 718/102 |
| 2014/0359624 | A1* | 12/2014 | Cherkasova | G06F 11/3404 718/100 |

* cited by examiner

*Primary Examiner* — Omar Fernandez Rivas
*Assistant Examiner* — Hering-Der Day
(74) *Attorney, Agent, or Firm* — Ryan, Mason & Lewis, LLP

(57) ABSTRACT

A generic performance model is generated for a program job, wherein the program job executes one or more map tasks in a map phase and one or more reduce tasks in a reduce phase in a distributed computing system. The generic performance model is trained to generate a trained performance model based on historical performance of the program job and a set of one or more program job-specific parameters. Performance of a subsequent execution of the program job is predicted based on the trained performance model.

20 Claims, 4 Drawing Sheets

LEARNING-BASED DATA PROCESSING JOB PERFORMANCE MODELING AND PREDICTION

FIELD

The field relates to data processing, and more particularly to data processing techniques for modeling and predicting the performance of a data processing job that executes mapping and reducing tasks in a distributed computing system

BACKGROUND

MapReduce is a programming paradigm for processing large datasets in a parallel manner on a large cluster of distributed processing devices. Such a large cluster of distributed processing devices may typically be known as a massively distributed computing platform (MDCP). A MapReduce job is a data processing job composed of a map phase that performs filtering and sorting on a large dataset and a reduce phase that performs a summary operation on the filtered/sorted dataset. A MapReduce system is a system that includes and controls the distributed processing devices as they execute the various tasks in parallel, and manages communications and data transfers between the distributed processing devices and other components of the system. A MapReduce system also provides redundancy and fault tolerance. One example of a MapReduce system is an open-source implementation known as the Apache Hadoop™ (Apache Software Foundation) framework. Pivotal HD™ is an example of a Hadoop™ based implementation available from EMC Corporation of Hopkinton, Mass. It is known that analyzing and optimizing MapReduce jobs are challenging tasks.

SUMMARY

Embodiments of the present invention provide data processing techniques for modeling and predicting the performance of a data processing job that executes mapping and reducing tasks in a distributed computing system.

For example, in one embodiment, a method comprises the following steps. A generic performance model is generated for a program job, wherein the program job executes one or more map tasks in a map phase and one or more reduce tasks in a reduce phase in a distributed computing system. The generic performance model is trained to generate a trained performance model based on historical performance of the program job and a set of one or more program job-specific parameters. Performance of a subsequent execution of the program job is predicted based on the trained performance model.

In another embodiment, an article of manufacture is provided which comprises a processor-readable storage medium having encoded therein executable code of one or more software programs. The one or more software programs when executed by at least one processing device implement steps of the above-described method.

In a further embodiment, an apparatus comprises a memory and a processor operatively coupled to the memory and configured to perform steps of the above-described method.

Advantageously, a performance model in accordance with the above-described method is generated via a combination of analytical and machine learning techniques, significantly improving its accuracy in a MapReduce system.

These and other features and advantages of the present invention will become more readily apparent from the accompanying drawings and the following detailed description.

DETAILED DESCRIPTION

Embodiments of the present invention will be described herein with reference to exemplary data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "data processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Embodiments of the invention realize that an accurate performance model for MapReduce is increasingly important for analyzing and optimizing MapReduce jobs. Such an accurate performance model is important as a theoretical foundation when implementing cost-based MapReduce job scheduling strategies in various MapReduce implementations such as Hadoop' and Pivotal HD', and when translating a Structured Query Language (SQL)-like query into an optimal set of efficient MapReduce jobs. Still further, such an accurate performance model finds benefits which include, but are not limited to: admission control (e.g., knowing the execution time of an incoming MapReduce job can enable cost-based decisions on admission control); job scheduling (e.g., knowing the MapReduce job execution time is crucial in deadline and latency aware scheduling); progress monitoring (e.g., knowing the execution time of an incoming MapReduce job can help avoid so-called "rogue jobs" that are submitted in error and take an unreasonably long time to execute); and system sizing (e.g., knowing job execution time as a function of hardware resources can help in system sizing).

Embodiments of the invention provide a MapReduce job performance model that is based on detailed analysis of MapReduce job execution phases and machine learning techniques. Embodiments of the invention also utilize such a MapReduce job performance model to conduct convenient, efficient and accurate prediction of MapReduce job performance.

In one illustrative embodiment, MapReduce job performance modeling and prediction comprises three parts. The first part, modeling, breaks down a MapReduce job's execution into multiple steps and derives the corresponding job cost model. The second part, training, learns job-specific parameters of the cost model from the execution histories of a specific job. The third part, prediction, utilizes the cost model to predict the performance of the future executions of that job.

Figure 1:
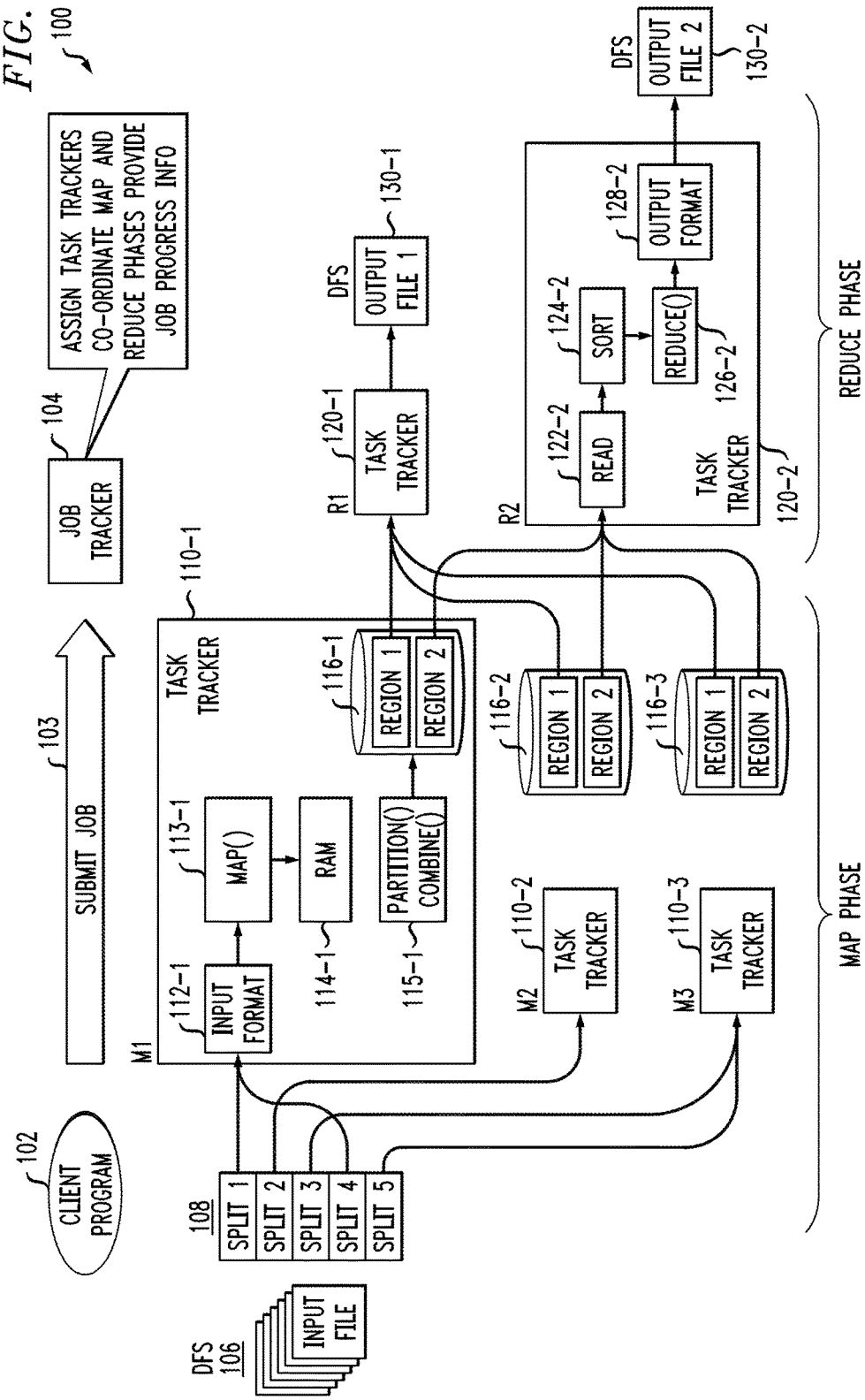
FIG. 1 shows a MapReduce system in accordance with which one or more embodiments of the invention are implemented.

Before describing illustrative embodiments of performance modeling and prediction techniques, we describe an example of how a MapReduce system executes a job in the context of FIG. 1.

Assume, in a very simple example, that there is a set of text documents and there is a need to perform a first step of counting the number of times each word occurs in the text documents and then a second step of sorting the output from the first step based on the number of occurrences. This could be performed using the MapReduce paradigm where the first step is a map phase and the second step is a reduce phase.

MapReduce operates on input data as, conceptually, a list of records. The records are split among the different processing devices in the cluster in the map phase. The result of the map computation is a list of key/value pairs (in the example above, a word is a key and how many times the word occurred is the value for that key). Each processing device that is participating in the map phase generates its own list of key/value pairs. The reduce phase then takes each set of values that has the same key and combines them into a single value. Note that there may be multiple processing devices executing parts (regions) of the reduce phase, followed by another part of the reduce phase that combines results from the multiple regions into a single result. Accordingly, the map phase takes a set of data and produces key/value pairs and the reduce phase merges data items in these pairs, so that instead of a set of key/value pair sets, the MapReduce job produces one result (in the example above, occurrence of each word across the multiple text documents).

FIG. 1 shows a MapReduce system in accordance with which one or more embodiments of the invention are implemented. As shown in system 100, a client program 102 submits a MapReduce job 103 to a job tracker module 104. The job tracker module 104 assigns specific tasks associated with the job to specific processing devices in the large cluster of distributed processing devices that are part of the MapReduce system. Each processing device to which a task of the job is assigned is also referred to as a "task tracker." There are task trackers (e.g., M1 denoted as 110-1, M2 denoted as 110-2, and M3 denoted as 110-3) in the map phase of the job execution and task trackers (e.g., R1 denoted as 120-1, and R2 denoted as 120-2) in the reduce phase of the job execution. The job tracker module 104 coordinates the map and reduce phases, and provides job progress information as the job is executed in the system.

More particularly, as shown in FIG. 1, a distributed file system (DFS) 106 includes multiple input files (in the example above, these could be the text documents). The job tracker module 104, in the map phase, splits the full set of input files from the DFS into subsets of input files 108 (e.g., split1, split2, . . . split5). Each subset could be a single file or multiple files. One or more subsets of input files are assigned to a particular task tracker 110 (i.e., a particular processing device of the cluster). In a given task tracker 110 (as specifically shown in task tracker M1/110-1, but which is understood to occur similarly in M2/110-2 and M3/110-3), the data is formatted via input format module 112-1. Map function 113-1 is then applied to the data. For example, the data from the input files is put into a key/value list and stored in a memory buffer, i.e., random access memory (RAM) 114-1. A partition function and/or a combine function are applied to the data in module 115-1. Here the data is partitioned/combined into regions (e.g., Region1, Region2) and stored in memory 116-1.

Next, in the reduce phase, data from each region is provided to a processing device assigned by the job tracker module 104 to handle that data. Thus, as shown, Region1 data from M1, M2 and M3 is provided to task tracker R1/120-1, and Region2 data from M1, M2 and M3 is provided to task tracker R2/120-2. In a given task tracker 120 (as specifically shown in task tracker R2/120-2, but which is understood to occur similarly in R1/120-1), the data is read 122-2, sorted 124-2, reduced with reduce function 126-2, and formatted 128-2 to yield output file 2 denoted as 130-2. Output file 1, denoted as 130-1, and output file 2 can serve as inputs to a next part of the reduce phase so that a single output file (result) is obtained. Alternatively, the two output files can serve as the final result. The output file(s) are returned to the DFS 106.

Figure 2:
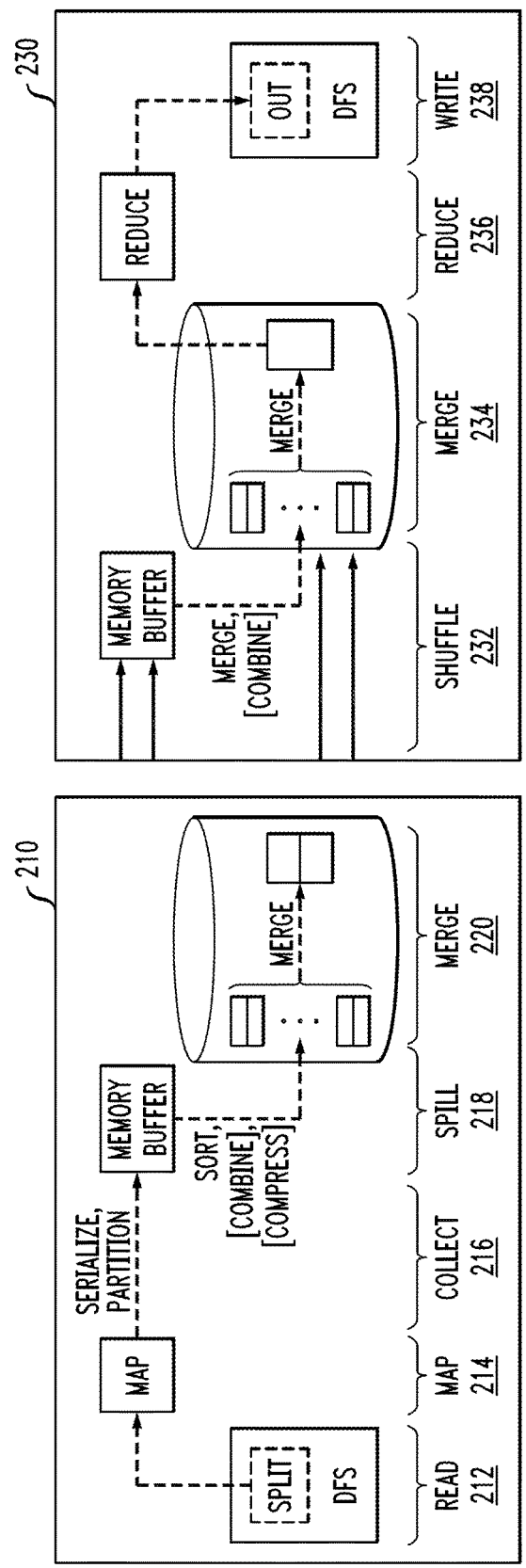
FIG. 2 shows further details of a MapReduce job execution methodology in accordance with which one or more embodiments of the invention are implemented.

FIG. 2 shows further details of a MapReduce job execution in accordance with which one or more embodiments of the invention are implemented. These further details will be referenced below in the context of FIG. 3 when describing an illustrative MapReduce job performance modeling and predicting system and methodology in accordance with one embodiment of the invention. As shown in FIG. 2, a map phase 210 can be broken into a read step 212, a map step 214, a collect step 216, a spill step 218, and a merge step 220. A reduce phase 230 can be broken into a shuffle step 232, a merge step 234, a reduce step 236, and a write step 238. These steps will be further referenced below.

Figure 3:
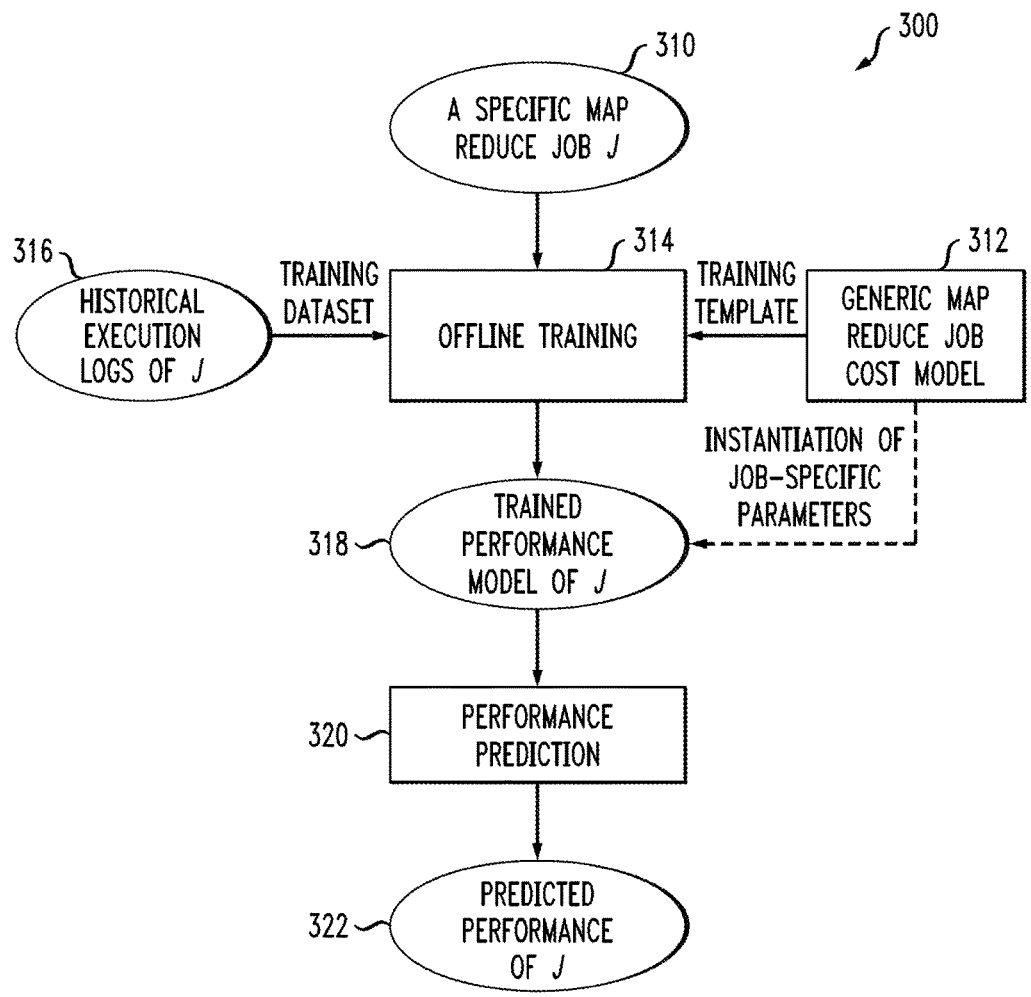
FIG. 3 shows a MapReduce job performance modeling and predicting system and methodology in accordance with one embodiment of the invention.

Turning now to FIG. 3, a MapReduce job performance modeling and predicting system and methodology are shown in accordance with one embodiment of the invention. As mentioned above, an illustrative embodiment of a MapReduce job performance modeling and predicting system and methodology comprises three main steps: cost modeling; offline training; and prediction. These steps are realized in accordance with system/methodology 300 in FIG. 3. The overall methodology will be generally explained here followed by a detailed explanation of each step below in the following subsections.

As shown in FIG. 3, a MapReduce job (J) 310 is provided to the system/methodology. A generic cost model 312 serves as a training template for an offline training process 314 which utilizes historical execution logs 316 of job 310 to generate a trained performance model 318. A performance prediction process 320 is performed using the trained performance model 318 to yield a predicted performance 322 of future executions of the MapReduce job 310. Details of these processes and results are explained in the following subsections.

Without loss of generality, the illustrative embodiments described in the subsections below are presented based on the Hadoop™-deployed MapReduce implementation. However, alternative embodiments are generally applicable in a straightforward manner to other MapReduce implementations.

1. Cost Modeling (312 in FIG. 3)

Embodiments of the invention sequentially analyze and model the cost of the map phase and the reduce phase of a MapReduce job. Accordingly, the total cost of a MapReduce job is the sum of its map phase cost and reduce phase cost.

1.1 Map Phase Model

Hadoop™ launches a MapReduce job by first splitting the input dataset into several data splits (108 in FIG. 1). Each data split is then scheduled to one map node (processing device in the cluster) and is processed by a map task. After the execution of a map task, the output key-value pairs are transferred to the reduce phase.

A map task is mainly divided into two pipelined stages:
1. Read Input: the input data split is read (212 in FIG. 2), and the key-value pairs are created and passed as input to the user-defined map function.
2. Invoke Map Function: the user-defined map function (214) is applied to each input key-value pairs and emits zero, one or multiple output key-value pairs. These output pairs are then partitioned, sorted, merged (cumulatively, collected 216) and spilled (218) to local disk (of the given processing device on which the map task is being processed) where they are merged (220), before they are transferred to the reduce phase.

The input data split of a map task is stored in HDFS (Hadoop' DFS), located in the local disk of its host map node or more probably in other remote nodes. It is assumed that reading the input data split is over a communications network, and thus the cost of this stage is formulated as:

$$\text{ReadInputCost}=\text{MapInputSplitSize}/\text{HdfsReadSpeed} \quad (1)$$

where MapInputSplitSize is the average size of each data split, and HdfsReadSpeed is the average speed of reading data from HDFS through the network.

In the stage of invoking map functions, the total central processing unit (CPU) instruction cycles are dependent on the function complexity and the total number of input key-value pairs, while the input/output (I/O) cost of data copy and move operations is proportional to the total size of input pairs. Therefore, the total cost of invoking the map function over the input key-value pairs is relevant to the function complexity, the total number of input pairs and the total size of input pairs. As such, we formulate this cost as a multiple regression model for offline training:

$$\text{MapFuncCost}(\text{MapInputSplitPair},\text{MapInputSplitSize})=\text{Complex}(\text{MapInputSplitPair})+\text{Complex}(\text{MapInputSplitSize}) \quad (2)$$

where MapInputSplitPair is the average number of input key-value pairs in a data split, and Complex is a non-linear regression function:

$$\text{Complex}(x) = \\ a_0 + a_1 * x + a_2 * x * \log x + \ldots + a_n * x^{\lfloor \frac{n+1}{2} \rfloor} * (\log x)^{\lfloor (n+1)/2 \rfloor}, n \geq 1 \quad (3)$$

which is used to capture the complexity of the map function and its correlation with the number and size of input key-value pairs. Note that MapFuncCost contains two variables MapInputSplitPair and MapInputSplitSize. When utilized for performance prediction, both the concrete n value and parameter values ($a_0$, $a_1$, $a_n$, etc.) in the two Complex( ) functions are learned from the historical training data set (316) for the target MapReduce job (310), as will be discussed in the offline training subsection below.

As a result, the cost of a map task is:

$$\text{MapTaskCost}=\text{ReadInputCost}+\text{MapFuncCost} \quad (4)$$

The input data for a MapReduce job is split into multiple data splits, each of which is then independently processed by a map task. These map tasks are assigned to a fixed set of map slots (e.g., M1, M2, M3, etc. in FIG. 1) in cluster nodes. Each map slot executes its assigned map tasks in sequence. The runtime statuses of a map slot thereby comprise:
1. Initialization, which lasts from the kick-off (start) of a MapReduce job until the map slot is ready to execute its first assigned map task.
2. Execution of a map task.
3. Switch between two consequently executed map tasks.

It is assumed that the nodes (slots) in a cluster are homogeneous, i.e., with more or less the same capacities of computation, memory and storage, and the data locality is ignored. In this case, Hadoop™ assigns a new map task to an arbitrary free map slot, turning the map task scheduling into the First-In-First-Out (FIFO) model. In the meantime, the costs of individual map tasks are predictable with the above modeling. As a result, for a specific map slot, the map task sequence assigned to it is predictable.

A MapSlotCost of a map slot is defined as the time elapsed from the moment when the MapReduce job is kicked off to the moment when the last map task assigned to this slot completes. MapSlotCost is formulated as:

$$\text{MapSlotCost}=\text{MapSlotInitCost}+(\text{MapTaskNum}-1)*\text{MapSlotSwitchCost}+\Sigma\text{MapTaskCost} \quad (5)$$

where MapSlotInitCost represents the average duration of this slot's initialization status, MapTaskNum is the total number of map tasks assigned to this slot, MapSlotSwitchCost is the average duration of this slot's switch status, and MapTaskCost is the total cost of executing all the assigned map tasks.

Since all map slots are running independently and in parallel, the entire map phase ends only after the last map task of some map slot completes. As such, the cost of the entire map phase is:

$$\text{MapPhaseCost}=\text{Max}_{1 \leq i \leq \text{MapSlotNum}}\text{MapSlotCost}_i \quad (6)$$

where MapSlotNum is the total number of map slots.

1.2 Reduce Phase Model

In the reduce phase, the output key-value pairs of the map tasks, previously saved on the local disks of host map nodes for the purpose of fault tolerance, are shuffled or transferred (232 in FIG. 2) over the communication network to different reduce tasks as their inputs. Once having successfully received all input data and merging the data (234), a reduce task applies the user-defined reduce function (236) to the input key-value pairs to generate and write (238) the final output key-value pairs to HDFS. Similar to map tasks, the reduce tasks are also assigned to a fixed set of reduce slots in cluster nodes. Each reduce slot executes its assigned reduce tasks in sequence.

Unlike the above map phase model, several challenges make a reduce phase model built at the granularity of reduce tasks unlikely to lead to convenient and accurate performance prediction:

1. Complicated overlapping between the map and the reduce phase. The reduce tasks and their data shuffling from map tasks are initialized once a (small) portion of map tasks complete, with other map tasks still running or even waiting for free map slots. In the meantime, the reduce tasks finish their own data shuffling either during or after the execution of the last map task. The pattern with which the map and reduce tasks are overlapped is complicated and difficult to model and measure.
2. Uncertain individual reduce task costs. The cost of an individual reduce task is composed of the cost of data shuffling and the cost of input data processing, both of which are difficult to model and predict. The data shuffling cost is heavily affected by the execution of map tasks, the overall scheduling of reduce tasks and the network traffic. The processing cost of input data, namely the map output data, is highly relevant to the input data properties, e.g., size, key-value pair number and key distribution, which are to a large extent unknown due to the highly possible lack of knowledge on the map input data and on the (user-defined) map function logics.

3. Uncertain scheduling of reduce tasks to reduce slots. Due to the uncertainty of the reduce task costs, it is also unlikely to precisely model and predict the exact sequence of reduce tasks that will be assigned to a specific reduce slot.

As a result, in accordance with an illustrative embodiment, a reduce phase model takes the reduce phase as a whole and is based on measures of "reduce workload" and "reduce slot vitality." The reduce workload measure refers to the accumulative working time of all reduce slots during the reduce phase. Each reduce slot starts working from the beginning of the reduce phase, and stops after its last assigned reduce task completes. The reduce slot vitality measure thereby refers to, at a specific timestamp of the reduce phase, the percentage of working reduce slots out of all (working or stopped) reduce slots. The reduce slot vitality measure degrades from 1 to 1/ReduceSlotNum throughout the whole reduce phase, where ReduceSlotNum is the total number of reduce slots.

The total cost of the reduce phase, ReducePhaseCost, is measured as the time elapsed from the end of the map phase, i.e., the moment when the last map task completes, to the moment when the last reduce task completes.

ReduceSlotPartCost of a reduce slot is defined as the time elapsed from the end of the map phase to the moment when the last reduce task assigned to this slot completes. As defined, the reduce workload, Reduce Workload, is the sum of ReduceSlotPartCost of all reduce slots involved in the reduce phase:

$$\text{ReduceWorkload} = \Sigma \text{ReduceSlotPartCost} \quad (7)$$

Reduce Workload is formulated as a multiple regression model for offline training:

$$\text{ReduceWorkload}(\text{MapInputPair}, \text{MapInputSize}) = \text{Complex}(\text{MapInputPair}) + \text{Complex}(\text{MapInputSize}) \quad (8)$$

where MapInputPair is a variable representing the total number of key-value pairs in the MapReduce job input data, MapInputSize is another variable representing the total size of the job input data, and Complex is a non-linear regression function as in equation (3). When utilized for performance prediction, the concrete parameter values in the two Complex( ) functions are learned from the historical training data set for the target MapReduce job, as will be further explained in the offline training subsection below. Since the job input data has already been in the HDFS before the job execution, compared with the map output data, the properties of the job input data are easier to obtain and are more accurately measured. Therefore, by capturing the complexity of the reduce function and its correlation with the job input data, the trained Reduce Workload model is more accurate than taking the map output data as model variables.

A function $U(x)$, which is learned from the offline training, is defined as:

$U(x)$=the reduce slot vitality when the reduce workload finishes percentage $x, 0 \leq x \leq 100\%$ With $U(x)$ and Reduce Workload, ReducePhaseCost is calculated as:

$$\text{ReducePhaseCost} = \int_0^{\text{ReduceWorkload}} \frac{dw}{U\left(\frac{w}{\text{ReduceWorkload}}\right) * \text{ReduceSlotNum}} = \frac{\text{ReduceWorkload}}{\text{ReduceSlotNum}} \int_0^1 \frac{dx}{U(x)} \quad (9)$$

Note that when $$\int_0^1 \frac{dx}{U(x)}$$

is simplified into a single variable y, equation (9) becomes:

$$\text{ReducePhaseCost} = \frac{\text{ReduceWorkload}}{\text{ReduceSlotNum}} * y \quad (10)$$

Comparing equations (9) and (10), it is concluded that, when utilized for performance prediction, the reduce phase model according to an embodiment of the invention performs at least as well as a simple linear regression model.

In addition, $U(x)$ and Reduce Workload are utilized to derive another two approximate costs of the reduce phase, ReducePhasePartCost and ReducePhaseCostInterval.

ReducePhasePartCost represents the time elapsed when the entire reduce phase finishes a certain percentage k (0≤k≤100%), and is calculated as:

$$\text{ReducePhasePartCost}(k) = \frac{\text{ReduceWorkload}}{\text{ReduceSlotNum}} \int_o^k \frac{dx}{U(x)} \quad (11)$$

ReducePhaseCostInterval represents the confidence interval of ReducePhaseCost with an error rate k (0≤k≤100%), and is calculated as:

ReducePhaseCostInterval(k)=[ReducePhasePartCost(1−k),ReducePhaseCost+ReducePhasePartCost(k)] (12)

ReducePhaseCostInterval gives the upper and lower bounds of ReducePhaseCost.

1.3 MapReduce Job Model (312 in FIG. 3)

As a result, the total cost of a MapReduce job J (310) is the sum of its map and reduce phase costs:

MRJobCost=MapPhaseCost+ReducePhaseCost (13)

2. Offline Training (314 in FIG. 3)

The above MapReduce cost model is generic. Before it can be utilized for predicting the performance of a specific MapReduce job, the following job-specific parameters are instantiated via offline training (314) with historical execution logs (316) of the same job as the training data set:

1. The multiple regression model MapFuncCost( ) in equation (2);
2. The values of MapSlotInitCost and MapSlotSwitchCost in equation (5);

3. The multiple regression model Reduce Workload( ) in equation (8);
4. The reduce slot vitality function U(x).

To learn MapFuncCost( ) and ReduceWorkload( ), in one illustrative embodiment, a canonical multiple regression analysis is used with two additional optimizations. The first optimization avoids the so-called overfitting problem, where the model is trained to be excessively complex and overfit a relatively small training data set, and thus generally has poor predictive performance as it can exaggerate minor fluctuations in the data. According to the Occam's Razor principle, a sufficiently fine model is derived by discarding as many high-order terms in equation (3) as possible. An alternative and abstract form of MapFuncCost( ) and Reduce Workload( ) is:

$$f(x, y, n) = \qquad (14)$$
$$a_0 + a_1 * x + a_2 * x * \log x + \ldots + a_n * x^{\lfloor \frac{n+1}{2} \rfloor} * (\log x)^{(n+1)/2} + b_0 +$$
$$b_1 * y + b_2 * y * \log y + \ldots + b_n * y^{\lfloor \frac{n+1}{2} \rfloor} * (\log y)^{(n+1)/2}, n \geq 1$$

When n=k, the trained MapFuncCost( ) (resp. ReduceWorkload( )) has the form f(x,y,k) and a corresponding goodness of fit, $M_k$ (resp. $R_k$), which is measured by methods such as the chi-square goodness of fit test. As such, the trained MapFuncCost( ) (resp. ReduceWorkload( )) is selected with a minimum k value such that $|M_{k+1}-M_k|$ (resp. $|R_{k+1}-R_k|$) is sufficiently small, e.g., under some predefined threshold.

The second optimization filters out noisy data within the training data set that result from irregular incidents during job execution, such as computing resource contention/starvation, cluster node failures, and network jams. For example, with the same input data split, if the MapPhaseCost of a specific historical job execution is significantly larger than that of other historical job executions, this MapPhaseCost is treated as noisy data and excluded from the training data set.

By treating equation (5) as a multiple linear regression function where MapSlotInitCost and MapSlotSwitchCost are both coefficients, the values of MapSlotInitCost and MapSlotSwitchCost are learned through linear regression analysis based on the vectors of <MapSlotCost, MapTaskNum, ΣMapTaskCost> obtainable from the historical job execution logs.

The reduce slot vitality function U(x) is learned as follows. From the logs of each historical job execution, the system (300) obtains the set S of ReduceSlotPartCost values, the total number N of involved reduce slots, as well as the corresponding Reduce Workload value W according to equation (7). Sorting S in the ascending order, according to the definition of U(x), results in:

$$U(x) = \frac{N-i+1}{N}, w(i-1) \leq x \leq w(i) \& 1 \leq i \leq N \qquad (15)$$

$$w(i) = \begin{cases} 0, & i = 0 \\ \dfrac{(N-i) * s_i + \sum_{k=1}^{i} s_k}{W}, & 1 \leq i \leq N \end{cases} \qquad (16)$$

where $s_i$ is the $i^{th}$ ReduceSlotPartCost value in the sorted S. Note that w(i), 1≤i≤N, actually represents the percentage of the finished reduce workload when the reduce slot with ReduceSlotPartCost $s_i$ stopped. Between w(i-1) and w(i), the reduce slot vitality is N-i+1/N.

Assume there are logs of M historical job executions in the training data set, then the final U(x) is derived as:

$$U(x) = \frac{\sum_{i=1}^{M} U_i(x)}{M} \qquad (17)$$

where $U_i(x)$ is the U(x) instance corresponding to the $i^{th}$ historical job execution.

3. Performance Prediction (320 in FIG. 3)

In one illustrative embodiment, the performance prediction for a MapReduce job utilizes the following parameters:
1. The properties of job input data, MapInputPair and MapInputSize, namely the total number of key-value pairs and their total size respectively;
2. The distinct properties of input data split for each map task i, MapInputSplitPair$_i$ and MapInputSplitSize$_i$, namely the total number of key-value pairs and their total size respectively;
3. The average speed of reading data from HDFS through the network, HdfsReadSpeed;
4. The number of map slots, MapSlotNum;
5. The number of map tasks, MapTaskNum; and
6. The number of reduce slots, ReduceSlotNum;

Among the above parameters, MapInputSize, MapInputSplitSize$_i$, MapSlotNum, MapTaskNum and ReduceSlotNum come with the job configuration. By sampling the job input data, the average width of input key-value pairs is acquired and thereby MapInputPair and MapInputSplitSize$_i$. HdfsReadSpeed is dependent on the cluster configuration and the runtime job executions by the cluster, and thus keeps changing within a long time interval. However, it is assumed that HdfsReadSpeed remains stable within a short time interval. As such, its value is acquired by periodically probing the cluster.

Using equation (4), the MapTaskCost of each map task is calculated. Then, according to equation (5), the FIFO scheduling of map tasks to map slots is simulated to derive the MapSlotCost of each map slot:

For each map slot i, 1≤i≤MapSlotNum

MapSlotCost$_i$=MapSlotInitCost-MapSlotSwitchCost

EndFor
For each map task j, 1≤j≤MapTaskNum
Look for the minimum MapSlotCost$_k$, 1≤k≤MapSlotNum MapSlotCost$_k$=MapSlotCost$_k$+MapSlotSwitchCost+MapTaskCost$_j$ EndFor
Then, according to equation (6), the cost of the map phase of the job is:

$$MapPhaseCost = \max_{1 \leq i \leq MapSlotNum} MapSlotCost_i$$

The cost of the reduce phase of the job, ReducePhaseCost, is calculated using equation (9). Then, according to equation (13), the total job cost is:

MRJobCost=MapPhaseCost+ReducePhaseCost

It is desirable to obtain a confidence interval of MRJobCost with an error rate k (0≤k≤100%), called MRJob- CostInterval(k), as the upper and lower bounds of MRJob-Cost. According to equations (11) and (12), MRJobCostInterval(k) is calculated as:

$$MRJobCostInterval(k) = [MapPhaseCost+ReducePhasePartCost(1-k), MRJobCost+ReducePhasePartCost(k)]$$

Accordingly, in one or more illustrative embodiments, the above-described MapReduce performance model is a combination of both analytical and machine learning techniques. The analytics part in the model accurately captures the clear and fixed part of the MapReduce job execution, while the machine learning part in the model accurately captures the complicated and hard-to-analyze part of the job execution. As a result, the model is of high prediction accuracy. Moreover, the model is generally applicable to any MapReduce implementations. Still further, the model is easy to use, as it utilizes a few input parameters that are either specified by the job configuration or easily acquirable.

Figure 4:
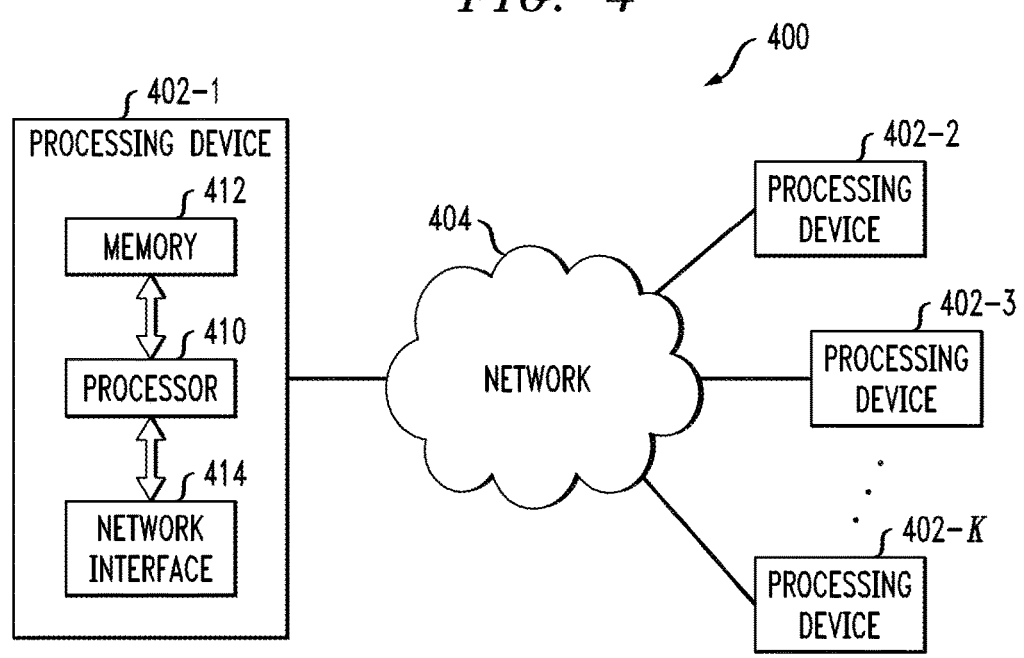
FIG. 4 shows processing infrastructure on which a MapReduce job performance modeling and predicting system and methodology are implemented in accordance with one embodiment of the invention.

An example of a processing platform on which a MapReduce system, comprising MapReduce job performance modeling and predicting functionalities as described herein, may be implemented is data processing platform 400 shown in FIG. 4. The processing platform 400 in this embodiment comprises a plurality of processing devices, denoted 402-1, 402-2, 402-3, . . . 402-K, which communicate with one another over a network 404. The processing devices 402 include the processing devices to which map and reduce tasks of a MapReduce job are assigned (e.g., as illustrated in FIGS. 1 and 2). Further, one or more of the processing devices 402 may implement components/steps of the MapReduce job performance modeling and prediction system and methodology 300 shown in FIG. 3. It is to be appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random access memory (RAM), read-only memory (ROM) or other types of memory, in any combination. The one or more software programs when executed by a processing device such as the processing device 402-1 causes the device to perform functions associated with one or more of the components/steps of system/methodology 300. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the network 404 and other system components. Such circuitry may comprise conventional transceivers of a type well known in the art.

The other processing devices 402 of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in the figure is presented by way of example only, and system 400 may include additional or alternative processing platforms, as well as numerous distinct processing platforms in any combination.

Also, numerous other arrangements of servers, clients, computers, storage devices or other components are possible in system 400. Such components can communicate with other elements of the system 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual machines (VMs) implemented using a hypervisor. A hypervisor is an example of what is more generally referred to herein as "virtualization infrastructure." The hypervisor runs on physical infrastructure. As such, the MapReduce performance modeling and prediction techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 400 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the MapReduce performance modeling and prediction functionality and features described herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:
generating a generic performance model for a program job, wherein the program job executes one or more map tasks in a map phase and one or more reduce tasks in a reduce phase in a distributed computing system;
wherein generating the generic performance model comprises modeling respective costs of the map phase and the reduce phase sequentially to generate a total cost of the program job as a sum of the map phase cost and the reduce phase cost;
wherein modeling the map phase cost comprises formulating at least a portion of the map phase cost as one or more map phase multiple regression models, each of the map phase multiple regression models comprising two or more inputs associated with data input to at least one of the one or more map tasks;
wherein modeling the reduce phase cost comprises formulating at least a portion of the reduce phase cost as one or more reduce phase multiple regression models, each of the reduce phase multiple regression models comprising two or more inputs associated with data input to at least one of the one or more reduce tasks;
instantiating a set of one or more program job-specific parameters using historical performance data of the program job, wherein the set of one or more program job-specific parameters comprises the one or more map phase multiple regression models and the one or more reduce phase multiple regression models;
generating a trained performance model by training the generic performance model using the set of one or more program job-specific parameters;
predicting performance of a subsequent execution of the program job based on the trained performance model; and
implementing one or more scheduling strategies associated with the program job based on the predicted performance;
wherein the steps of the method are performed via at least one processing device comprising a processor operatively coupled to a memory.

2. The method of claim 1, wherein modeling the map phase cost further comprises formulating a cost associated with reading the data input to the at least one map task, a cost associated with applying a mapping function to the data input to the at least one map task, and a cost associated with at least one map slot in which the at least one map task is assigned to execute.

3. The method of claim 2, wherein the cost associated with applying the mapping function to the data input to the at least one map task is formulated as one of the one or more map phase multiple regression models.

4. The method of claim 2, wherein the data input to the at least one map task comprises data read from a distributed file system.

5. The method of claim 4, further comprising creating key-value pairs from the data read from the distributed file system and applying the mapping function to the key-value pairs.

6. The method of claim 1, wherein modeling the reduce phase cost further comprises formulating a reduce workload measure and a reduce slot vitality measure.

7. The method of claim 6, wherein the reduce workload measure represents an accumulative working time of reduce slots assigned during execution of the reduce phase.

8. The method of claim 7, wherein the reduce workload measure is based on a total number of key-value pairs in input data of the program job, and a total size of the input data of the program job.

9. The method of claim 6, wherein the reduce slot vitality measure represents, at a specific time instance of the reduce phase, a percentage of working reduce slots out of a total number of reduce slots.

10. The method of claim 6, wherein the reduce workload measure is formulated as one of the one or more reduce phase multiple regression models.

11. The method of claim 1, wherein the set of one or more program job-specific parameters further comprises a map slot initiation cost; a map slot switch cost; and a reduce slot vitality function.

12. The method of claim 1, wherein the one or more map phase multiple regression models and the one or more reduce phase multiple regression models are optimized to minimize one or more of a data overfit problem and a data noise problem.

13. The method of claim 1, wherein predicting the performance of the subsequent execution of the program job model further comprises utilizing one or more of: properties of data input to the program job; of a splitting process of the input data; a speed associated with reading the input data; a number of map slots associated with the map phase; a number of map tasks associated with the map phase; and a number of reduce slots associated with the reduce phase.

14. The method of claim 1, wherein the program job comprises a MapReduce job.

15. The method of claim 1, wherein the distributed computing system comprises a massively distributed computing platform.

16. The method of claim 15, wherein the massively distributed computing platform comprises a distributed virtual infrastructure.

17. An article of manufacture comprising a non-transitory processor-readable storage medium having encoded therein executable code of one or more software programs, wherein the one or more software programs when executed by at least one processing device implement the steps of:
generating a generic performance model for a program job, wherein the program job executes one or more map tasks in a map phase and one or more reduce tasks in a reduce phase in a distributed computing system;

wherein generating the generic performance model comprises modeling respective costs of the map phase and the reduce phase sequentially to generate a total cost of the program job as a sum of the map phase cost and the reduce phase cost;

wherein modeling the map phase cost comprises formulating at least a portion of the map phase cost as one or more map phase multiple regression models, each of the map phase multiple regression models comprising two or more inputs associated with data input to at least one of the one or more map tasks;

wherein modeling the reduce phase cost comprises formulating at least a portion of the reduce phase cost as one or more reduce phase multiple regression models, each of the reduce phase multiple regression models comprising two or more inputs associated with data input to at least one of the one or more reduce tasks;

instantiating a set of one or more program job-specific parameters using historical performance data of the program job, wherein the set of one or more program job-specific parameters comprises the one or more map phase multiple regression models and the one or more reduce phase multiple regression models;

generating a trained performance model by training the generic performance model using the set of one or more program job-specific parameters;

predicting performance of a subsequent execution of the program job based on the trained performance model; and implementing one or more scheduling strategies associated with the program job based on the predicted performance.

18. The article of claim 17, wherein modeling the map phase cost further comprises formulating a cost associated with reading the data input to the at least one map task, a cost associated with applying a mapping function to the data input to the at least one map task, and a cost associated with at least one map slot in which the at least one map task is assigned to execute.

19. The article of claim 17, wherein modeling the reduce phase cost further comprises formulating a reduce workload measure and a reduce slot vitality measure, and wherein the reduce slot vitality measure represents, at a specific time instance of the reduce phase, a percentage of working reduce slots out of a total number of reduce slots.

20. An apparatus, comprising:
a memory; and
a processor operatively coupled to the memory and configured to:
  generate a generic performance model for a program job, wherein the program job executes one or more map tasks in a map phase and one or more reduce tasks in a reduce phase in a distributed computing system;
  wherein, in generating the generic performance model, the processor is configured to model respective costs of the map phase and the reduce phase sequentially to generate a total cost of the program job as a sum of the map phase cost and the reduce phase cost;
  wherein the modeling of the map phase cost comprises a formulation of at least a portion of the map phase cost as one or more map phase multiple regression models, each of the map phase multiple regression models comprising two or more inputs associated with data input to at least one of the one or more map tasks;
  wherein the modeling of the reduce phase cost comprises a formulation of at least a portion of the reduce phase cost as one or more reduce phase multiple regression models, each of the reduce phase multiple regression models comprising two or more inputs associated with data input to at least one of the one or more reduce tasks;
  instantiate a set of one or more program job-specific parameters using historical performance data of the program job, wherein the set of one or more program job-specific parameters comprises the one or more map phase multiple regression models and the one or more reduce phase multiple regression models;
  generate a trained performance model by training the generic performance model using the set of one or more program job-specific parameters;
  predict performance of a subsequent execution of the program job based on the trained performance model; and
  implement one or more scheduling strategies associated with the program job based on the predicted performance.

* * * * *